US012681377B2

(12) United States Patent
Zhou et al.

(10) Patent No.: US 12,681,377 B2
(45) Date of Patent: Jul. 14, 2026

(54) PROJECTOR CURTAIN

(71) Applicants: IVTECH JIANGSU CO., LTD., Nantong (CN); IVTOUCH CO., LTD., Suzhou (CN); SVG TECH GROUP CO., LTD., Suzhou (CN)

(72) Inventors: Xiaohong Zhou, Nantong (CN); Ming Zhu, Nantong (CN); Donglin Pu, Nantong (CN); Pengfei Zhu, Nantong (CN); Haoshu Zhu, Nantong (CN); Rubin Sun, Nantong (CN); Linsen Chen, Nantong (CN)

(73) Assignees: IVTECH JIANGSU CO., LTD., Nantong (CN); IVTOUCH CO., LTD., Suzhou (CN); SVG TECH GROUP CO., LTD., Suzhou (CN)

( * ) Notice: Subject to any disclaimer, the term of this patent is extended or adjusted under 35 U.S.C. 154(b) by 288 days.

(21) Appl. No.: 18/270,875

(22) PCT Filed: Jan. 18, 2022

(86) PCT No.: PCT/CN2022/072479
§ 371 (c)(1),
(2) Date: Jul. 5, 2023

(87) PCT Pub. No.: WO2022/152310
PCT Pub. Date: Jul. 21, 2022

(65) Prior Publication Data
US 2024/0069426 A1 Feb. 29, 2024

(30) Foreign Application Priority Data
Jan. 18, 2021 (CN) .......................... 202110062212.2

(51) Int. Cl.
B29C 65/00 (2006.01)
G02B 3/08 (2006.01)
(Continued)

(52) U.S. Cl.
CPC ............. G03B 21/602 (2013.01); G02B 3/08 (2013.01); B29C 65/48 (2013.01); B29C 65/483 (2013.01)

(58) Field of Classification Search
CPC ........ G03B 21/602; G02B 3/08; B29C 65/48; B29C 65/483
See application file for complete search history.

(56) References Cited

U.S. PATENT DOCUMENTS

| | | | |
|---|---|---|---|
| 6,023,369 A | 2/2000 | Goto | |
| 2014/0092471 A1* | 4/2014 | Sadahiro | G03B 21/60 |
| | | | 359/449 |
| 2016/0223720 A1* | 8/2016 | Block | G02B 3/08 |
| 2019/0354002 A1 | 11/2019 | Hu et al. | |

FOREIGN PATENT DOCUMENTS

| | | |
|---|---|---|
| CN | 106990665 A | 7/2017 |
| CN | 109426061 A | 3/2019 |

(Continued)

OTHER PUBLICATIONS

"Notice of Reason for Refusal" received for Japanese Patent Application No. 2023541710, mailed on Apr. 23, 2024, pp. 18.

(Continued)

*Primary Examiner* — Philip C Tucker
*Assistant Examiner* — Nickolas R Harm
(74) *Attorney, Agent, or Firm* — Harmohinder S. Bedi

(57) ABSTRACT

A projection curtain is provided in the present invention. The projection curtain at least comprises a reflective layer and one of a colored layer, a diffusion layer, and a Fresnel lens layer. The Fresnel lens layer is a spherical Fresnel lens layer or an aspherical Fresnel lens layer. The Fresnel lens layer comprises a plurality of annular protrusions protruding from a plane, the plurality of annular protrusions are arranged in circular bands. A cross-sectional shape of each annular protrusion along a cross section perpendicular to the plane is (Continued)

Protrusion a triangular shape or a multi-step shape or a free surface shape. The width of one side of each cross-sectional shape parallel to the plane gradually changes, and gradual change of the cross-sectional shape and the width thereof determines light gathering characteristics of the spherical Fresnel lens layer or the aspherical Fresnel lens layer. A surface of each annular protrusion has scattered microstructures. The projection curtain provided in the present invention exhibits higher brightness and larger viewing angle than existing projection curtains.

1 Claim, 8 Drawing Sheets

(51) Int. Cl.
 *G03B 21/602* (2014.01)
 *B29C 65/48* (2006.01)

(56) References Cited

FOREIGN PATENT DOCUMENTS

| CN | 109426062 A | 3/2019 |
| CN | 109725484 A | 5/2019 |
| CN | 209765259 U | 12/2019 |
| CN | 110824825 A | 2/2020 |
| CN | 112099303 A | 12/2020 |
| JP | 2009524112 A | 6/2009 |
| JP | 2013171114 A | 9/2013 |
| JP | 2017026759 A | 2/2017 |
| KR | 20150095287 A | 8/2015 |

OTHER PUBLICATIONS

International Search Report and Written Opinion received for International Patent Application No. PCT/CN2022/072479 mailed on Apr. 24, 2022 , 11 pages.

* cited by examiner

Protrusion

Diffusion layer

Light incident side

Reflective layer

Fresnel lens layer

Substrate layer

Light incident side

Reflective layer

Fresnel lens layer

| Serial number | Process | Gain | Half viewing angle/° | Base membrane transmittance /% | Base membrane haze | Aluminum layer / μm |
|---|---|---|---|---|---|---|
| 1 | Random point + aluminum plating | 1 | ±>30 | 76.2 | 69.3 | 2.16 |
| | | | | 75.5 | 67.9 | 1.98 |
| 2 | | 1.18 | ±>30 | 81.6 | 71.4 | 2.15 |
| | | | | 80.5 | 71.1 | 2.17 |
| 3 | | 1.18 | ± >30 | 84 | 73.9 | 2.08 |
| | | | | 87 | 72.7 | 1.91 |
| 4 | | 1.2 | Left viewing angle 27 Right viewing angle 30 | 82.5 | 74 | 2.12 |
| | | | | 82.9 | 73.6 | 1.9 |
| 5 | | 0.73 | ±>30 | 65.6 | 57.3 | 2.06 |
| | | | | 66.2 | 57.1 | 2.15 |
| 6 | Aluminum spraying | 1 | ±22 | 87 | 72.7 | 13.12 |

PROJECTOR CURTAIN

RELATED APPLICATION

This application is a National Stage Application of International Application No. PCT/CN2022/072479 filed on Jan. 18, 2022 which further claims priority from CN Patent Applications having Ser. No. 202110062212.2 respectively filed on Jan. 18, 2021, which is incorporated herein by reference for all purpose.

BACKGROUND OF THE INVENTION

Field of the Invention

The present invention relates to the technical field of display, in particular to a projection curtain.

Description of the Related Art

With development of various display technologies, people pay more and more attention to projection display technologies which can realize super-large display images. In order to achieve or surpass the mainstream liquid crystal display technology or organic display technology on the market in displaying image effects, the projection display technology requires not only high-quality projectors, but also high-quality optical projection screens as indispensable key components.

The optical projection screen is composed of a series of fine optical structures, which can redistribute the projector and the ambient light intensity in the screen structure. The optical projection screen has the characteristics of being capable of effectively weakening the ambient light intensity and enhancing the light intensity projected by the projector, and improving the image contrast, luminance gain, color reducibility, resolution, etc., and meeting people's demand for ultra-high image quality. A Fresnel screen is a common optical projection screen. The Fresnel screen adopts the principle of a Fresnel lens structure to collimate a light beam incident at a certain angle into parallel light, and finally sends the parallel light to human eyes for imaging. How to further enhance the interference resistance of the Fresnel screen to ambient light, and then improve the brightness and contrast of the Fresnel screen, has always been the goal pursued by engineers and research and development personnel.

In addition, a commonly used preparation method for a Fresnel lens in the Fresnel screen is diamond turning method. The Fresnel lens manufactured through the diamond turning method has microstructures with a low degree of precision, and a groove width thereof is usually 20-50 um. The microstructure with such a low degree of precision is not conducive to the improvement of light efficiency utilization rate. At the same time, the microstructure with a high degree of precision is not conducive to the processing of the Fresnel lens. How to reduce the processing difficulty of the Fresnel lens under the condition of ensuring that the light efficiency utilization rate is unchanged or even improved has always been the goal pursued by engineers and research and development personnel.

In addition, optical projection screens currently on sale on the market, such as Dai Nippon Printing Co., Ltd. (DNP) and Chengdu Fscreen Sci-Tech Co., Ltd, are hard screens supported by thick rigid backplanes, supplemented by decorative frames, pendants and other accessories. The hard screen optical projection screen is not only heavy, but also large in volume, and cannot be curled, which is not only unfavorable for handling, but also occupies a lot of space.

SUMMARY OF THE INVENTION

The present invention is intended to provide a projection curtain and a preparation method for the projection curtain to solve the above problems or some of the above problems.

The present invention provides a Fresnel lens. The Fresnel lens comprises a plurality of annular protrusions protruding from a plane. The plurality of annular protrusions are arranged in circular bands. A cross-sectional shape of each annular protrusion along a cross section perpendicular to the plane is a triangular shape. One side, parallel to the plane, of the triangular shape is called a first side, and the other two sides are called a second side and a third side. A height H of the first side of each triangular shape is same, and an angle $\alpha 1$ between the third side and the first side of each triangular shape is 90 degrees.

The present invention provides another Fresnel lens. The Fresnel lens comprises a plurality of annular protrusions protruding from a plane. The plurality of annular protrusions are arranged in circular bands. A cross-sectional shape of each annular protrusion along a cross section perpendicular to the plane is a multi-step shape. One side, parallel to the plane, of the multi-step shape is called a first side, one side with steps is called a second side, one side without steps is called a third side, and the third side is perpendicular to the first side. One side of two sides of each step is perpendicular to the first side and the other side of two sides of each step is parallel to the first side. A vertical distance from one side parallel to the first side of one step farthest from the first side of each multi-step shape to the first side is called a height H of the first side. The height H of the first side of each multi-step shape is equal.

Optionally, the height H of the first side is:

$$H = P\frac{\lambda}{n-1}.$$

Counting from a center outward, a length $L_j$ of the first side of a $j^{th}$ triangular shape or multi-step shape is:

$$L_j = \sqrt{2P\lambda f}\left(\sqrt{j} - \sqrt{j-1}\right)$$

wherein P is an integer greater than or equal to 1, $\lambda$ is a central wavelength, and f is a focal length of the Fresnel lens.

Optionally, the height of the first side is 1-20 μm.

Optionally, an angle $\beta 1$ between the second side and the first side of each triangular shape is 65-81 degrees.

Optionally, the length of the first side is 0.02-0.3 mm.

Optionally, surfaces of the annular protrusions have scattered microstructures.

The present invention provides a design method for a Fresnel lens. The Fresnel lens comprises a plurality of annular protrusions protruding from a plane. The plurality of annular protrusions are arranged in circular bands. A cross-sectional shape of each annular protrusion along a cross section perpendicular to the plane is a triangular shape or a multi-step shape. One side, parallel to the plane, of the triangular shape or multi-step shape is called the first side. Counting outward from the center, the length $L_j$ of the first side of the $j^{th}$ triangular shape or multi-step shape is:

$$L_j = \sqrt{2P\lambda f}\left(\sqrt{j} - \sqrt{j-1}\right)$$

wherein P is an integer greater than or equal to 1, $\lambda$ is the central wavelength, and f is the focal length of the Fresnel lens.

Optionally, the length $L_j$ of the first side of the $j^{th}$ triangular shape or multi-step shape is obtained through the following steps:

At step 1, assuming that a radius of a spherical lens is R, the refractive index of a lens material of the spherical lens is n, and then a focal length of the spherical lens is:

$$f = \frac{R}{n-1}.$$

At step 2, collapsing a lens surface, the height H of each collapse is:

$$H = P\frac{\lambda}{n-1},$$

the $j^{th}$ circular band, collapsing j times.

At step 3, assuming that the radius of the $j^{th}$ circular band is $a_j$, according to the triangle relationship, there is:

$$a_j^2 + \left(R - j\frac{P\lambda}{n-1}\right)^2 = R^2.$$

Obtaining after expansion:

$$a_j^2 + j\left(\frac{P\lambda}{n-1}\right)\left(j\frac{P\lambda}{n-1} - 2R\right) = 0,$$

wherein $$\frac{\lambda}{n-1}$$

is very small relative to 2R, may be approximated by ignoring, and then the radius expression after approximation is:

$$a_j = \sqrt{2Rj\frac{P\lambda}{n-1}} = \sqrt{2jP\lambda f}.$$

At step 4, the length $L_j$ of the first side of the $j^{th}$ triangular shape or multi-step shape or free surface shape is:

$$L_j = \sqrt{2P\lambda f}\left(\sqrt{j} - \sqrt{j-1}\right).$$

The present invention provides a Fresnel lens mold. The Fresnel lens mold comprises a plurality of annular microstructure units protruding along a plane. The plurality of annular microstructure units are arranged in circular bands. A cross-sectional shape of each annular microstructure unit along a cross section perpendicular to the plane is a triangular shape or a multi-step shape. One side, parallel to the plane, of the triangular shape or multi-step shape is called a first side. Counting outward from the center, the length $L_j$ of the first side of a $j^{th}$ triangular shape or multi-step shape or free surface shape is:

$$L_j = \sqrt{2P\lambda f}\left(\sqrt{j} - \sqrt{j-1}\right)$$

wherein P is an integer greater than or equal to 1, $\lambda$ is the central wavelength, and f is the focal length of the Fresnel lens.

Similar to a definition of the height H of the first side of the triangular shape or multi-step shape or free-surface shape in the first and second embodiments, the height H of the first side of the triangular shape or multi-step shape or free-surface shape of the cross section of the annular microstructure unit is:

$$H = P\frac{\lambda}{n-1}$$

wherein n is the refractive index of the Fresnel lens.

The present invention provides a preparation method for the Fresnel lens mold. The preparation method for the Fresnel lens mold comprises the following steps:

At Step 1: a three-dimensional model diagram is provided.

At step 2: at least one curvature function $f_1(x)$ is set, and the height of each point in the three-dimensional model is determined according to the curvature function $f_1(x)$.

At step 3: the three-dimensional model diagram is divided in a height direction to obtain a plurality of height intervals.

At Step 4: the three-dimensional model diagram is projected on the plane to obtain a gray scale image. The gray scale image comprises a plurality of pixel points, and each pixel point comprises a position and a gray scale value. A projection of the three-dimensional model diagram on a horizontal plane comprises a plurality of points, and each point comprises a position and a height value. The position of each point corresponds to the position of one pixel point in the gray scale image, and each height interval of the three-dimensional model diagram corresponds to a gray scale value range. According to the height range of the height interval where the height value of the three-dimensional model diagram is, and the corresponding function $f_2(x)$ of the gray scale value range, the gray scale value corresponding to the height value is calculated, and the gray scale value of the corresponding pixel point of the gray scale image is obtained.

At step 5: photoresist is coated on a target carrier, and lithography is performed according to the gray scale image, where According to a corresponding function $f_3(x)$ of the gray scale value and a lithography time, a patterned structure is formed on the target carrier through exposure and development.

At step 6: the patterned structure is transferred to another carrier through a UV transfer or metal growth process to form the Fresnel lens mold complementary to a pattern of the Fresnel lens.

The present invention provides a preparation method for the Fresnel lens mold. The preparation method for the Fresnel lens mold comprises the following steps.

At step 1: a three-dimensional model diagram is provided.

At step 2: at least one curvature function $f_1(x)$ is set, and the height of each point in a three-dimensional model is determined according to the curvature function $f_1(x)$.

At step 3: the three-dimensional model diagram is divided in a height direction to obtain a plurality of height intervals.

At Step 4: the three-dimensional model diagram is projected on the plane to obtain a gray scale image. The gray scale image comprises a plurality of pixel points, and each pixel point comprises a position and a gray scale value. A projection of the three-dimensional model diagram on a horizontal plane comprises a plurality of points, and each point comprises a position and a height value. The position of each point corresponds to the position of one pixel point in the gray scale image, and each height interval of the three-dimensional model diagram corresponds to a gray scale value range. According to the height range of the height interval where the height value of the three-dimensional model diagram is, and the corresponding function $f_2(x)$ of the gray scale value range, the gray scale value corresponding to the height value is calculated, and the gray scale value of the corresponding pixel point of the gray scale image is obtained.

At Step 5: a plurality of sets of binary images are obtained by sampling the gray scale image.

At step 6: photoresist is coated on a target carrier, superimposed lithography is performed based on the plurality of sets of binary images, and a multi-step-shaped patterned structure is formed on the target carrier through exposure and development.

At step 7: the patterned structure is transferred to another carrier through a UV transfer or metal growth process to form the Fresnel lens mold complementary to a pattern of the Fresnel lens.

Optionally, the three-dimensional model of the three-dimensional model diagram is preferably a cone. A radius R of a bottom circle of the cone is:

$$R = \sqrt{2P\lambda f}\left(\sqrt{N}\right) \qquad 4\text{-}1$$

An angle $\alpha$ between a generatrix of the cone and the bottom circle of the cone is:

$$\tan \alpha = \frac{H}{\sqrt{2P\lambda f}\left(\sqrt{N} - \sqrt{N-1}\right)} \qquad 4\text{-}2$$

wherein $$H = P\frac{\lambda}{n-1} \qquad 4\text{-}3$$

P is an integer greater than or equal to 1, n is the refractive index of the Fresnel lens material, $\lambda$ is the central wavelength, f is the focal length of the Fresnel lens, and N is the total number of annular microstructure units.

Optionally, the three-dimensional model of the three-dimensional model diagram is preferably hemispherical, and the radius R of the bottom circle of the hemisphere is:

6

$$R = \sqrt{2P\lambda f}\left(\sqrt{N}\right) \qquad 4\text{-}4$$

Optionally, the curvature function $f_1(x)$ is:

$$f_1(x) = x \tan \alpha \qquad 4\text{-}5$$

Optionally, the curvature function $f_1(x)$ is:

$$f_1(x) = \frac{H}{\Delta R_{j+1}}x \qquad 4\text{-}6$$

wherein $$\Delta R_{j+1} = \sqrt{2P\lambda f}\left(\sqrt{j+1} - \sqrt{j}\right) \qquad 4\text{-}7$$

wherein the independent variable x refers to the distance from a point on a radius of the conical bottom circle or the hemisphere bottom circle to one end, away from the center of the bottom circle, of the radius.

Optionally, the cone is divided into N parts by planes parallel to the bottom of the cone. Counting from the top of the cone, a length $\Delta L_j + 1$ of the conic generatrix cut by the $(j+1)^{th}$ height interval is:

$$\Delta L_{j+1} = \frac{\Delta R_{j+1}}{\cos \alpha} \qquad 4\text{-}8$$

Optionally, the hemisphere is divided into N equal parts by planes parallel to the bottom circle of the hemisphere. The length of each part:

$$\Delta L = \frac{\pi R}{2N} \qquad 4\text{-}9$$

Optionally, the function $f_2(x)$ corresponding to the gray scale value within the gray scale value range and the height value within the height range of the $(j+1)^{th}$ height interval is preferably:

$$f_2(x) = \frac{Q_{max}}{\Delta R_{j+1} \tan \alpha}x \qquad 4\text{-}10$$

Optionally, the function $f_2(x)$ corresponding to the gray scale value within the gray scale value range and the height value within the height range of the $(j+1)^{th}$ height interval is preferably:

$$f_2(x) = \frac{Q_{max}}{H}x \qquad 4\text{-}11$$

wherein the gray scale value range is greater than or equal to 0 and less than or equal to Qmax. Qmax is the largest gray scale value in the gray scale value range, and the independent variable x refers to the height value in the height range.

Optionally, the function $f_3(x)$ of the lithography time and the gray scale value is preferably:

$$f_3(x) = -\frac{H}{Q_{max}\eta}x + \frac{H}{\eta} \qquad 4\text{-}12$$

wherein $\eta$ is a rate of lithography, i.e., the depth of lithography per unit time; and the independent variable x refers to the gray scale value.

Optionally, $$f_3(x) = f_3(x_2) \qquad 4\text{-}13$$

wherein $$x_1 \le x < x_2$$

Optionally, $$x_1 = \frac{Q_{max}}{M}i$$

$$x_2 = \frac{Q_{max}}{M}(i+1)$$

wherein M is the number of steps, and i is an integer greater than or equal to 0 and less than M.

Optionally, M−1 sets of binary images are obtained by sampling the gray scale image according to the number of steps M. Pixel points with gray scale values in a first range are assigned to black (or white), and pixel points with gray scale values in other ranges are assigned to white (or black) to obtain a first set of binary images. Pixel points with gray scale values in a second range are assigned to black (or white), and pixel points with gray scale values in other ranges are assigned to white (or black) to obtain a second set of binary images. Pixel points with gray scale values in a $k^{th}$ range are assigned to black (or white), and pixel points with gray scale values in other ranges are assigned to white (or black) to obtain a $k^{th}$ set of binary images. The $k^{th}$ range at least partially covers the $(k-1)^{th}$ range, M is an integer greater than or equal to 2, black represents 1 in the binary, and white represents 0 in the binary.

Optionally, the target carrier is baked after lithography to obtain a smooth patterned structure.

The present invention provides a projection curtain. The projection curtain comprises a colored layer, a diffusion layer, a Fresnel lens layer, and a reflective layer sequentially stacked along a thickness direction; or the projection curtain comprises a diffusion layer, a colored layer, a Fresnel lens layer, and a reflective layer sequentially stacked along a thickness direction.

The present invention provides a projection curtain. The projection curtain comprises a colored layer, a Fresnel lens layer, and a reflective layer sequentially to stacked along a thickness direction, wherein diffusion particles are added to the Fresnel lens layer.

The present invention provides a projection curtain. The projection curtain comprises a diffusion layer, a Fresnel lens layer, and a reflective layer sequentially stacked along a thickness direction, wherein colored particles are added to the Fresnel lens layer.

The present invention provides a projection curtain. The projection curtain comprises a Fresnel lens layer, and a reflective layer sequentially stacked along a thickness direction. Colored particles and diffusion particles are added to a substrate layer of the Fresnel lens layer, or a film with a certain haze, or the colored particles and diffusion particles are added to the Fresnel lens.

Optionally, the Fresnel lens layer is arranged on the substrate, wherein the substrate is a high-transmittance resin material with a light transmittance of more than 75% and a thickness of 10-200 μm.

Optionally, the Fresnel lens layer and the substrate are integrally formed; or the Fresnel lens layer is bonded to the substrate through an optical clear adhesive (OCA).

Optionally, the Fresnel lens layer is arranged on the film with a certain haze, wherein the haze value of the film is 50-90% and the thickness is 50-200 μm.

Optionally, the Fresnel lens layer is bonded to the film with a certain haze through the OCA.

Optionally, the Fresnel lens layer is a spherical Fresnel lens layer or an aspherical Fresnel lens layer.

Optionally, the thickness of the OCA is 10-200 μm.

Optionally, the thickness of the colored layer is 10-200 μm, and the light transmittance of the colored layer is 50-90%.

Optionally, the colored layer is a nickel-plated layer, and the light transmittance of the colored layer is 50-90%.

Optionally, the diffusion layer is a translucent resin mixed with diffusion particles.

Optionally, the thickness of the diffusion layer is 50-1000 μm.

Optionally, the diffusion layer is micro-nano structures with a diffusion function, and the cross-sectional shape is one or a combination of two or more of arc, triangle, square, rectangle, trapezoid or irregular shape.

Optionally, the height of the micro-nano structure is 1-20 μm.

Optionally, the micro-nano structure is made of flexible materials.

Optionally, the diffusion layer is a semi-transparent and semi-reflective film with a haze value of 50-90% and a transmittance of 55-65%.

Optionally, the reflective layer is a metal reflective layer or an alloy reflective layer.

Optionally, the metal reflective layer comprises aluminum, silver, gold, chromium, nickel or copper; and the alloy reflective layer comprises nickel-chromium alloy, aluminum alloy or titanium alloy.

Optionally, the reflective layer is an aluminum metal reflective layer, which is prepared through a coating or spraying technology.

Optionally, when the aluminum metal reflective layer is prepared by the coating technology, the thickness of the aluminum metal reflective layer is 0.04-3 μm.

Optionally, the particle size of aluminum particles is less than or equal to 500 nm.

Optionally, when the aluminum metal reflective layer is prepared through the spraying technology, the thickness of the aluminum metal reflective layer is 10-20 μm.

Optionally, the particle size of the aluminum particles is greater than 5 μm.

Optionally, the difference between a refractive index of the Fresnel lens and a refractive index of the diffusion particles is less than 0.4.

Optionally, a particle size of the colored particles is less than 200 μm.

Optionally, a particle size of the diffusion particles is 1-50 μm.

The present invention further provides a preparation method for the projection curtain. The preparation method comprises the following operations: bonding any two of the diffusion layer, the colored layer and the Fresnel lens layer through an optical clear adhesive (OCA); or preparing the diffusion layer and the colored layer by coating, and then bonding the diffusion layer and the colored layer to the Fresnel lens layer through the OCA; or plating the colored layer on one surface of the diffusion layer, and then bonding the other surface of the diffusion layer to the Fresnel lens layer through the OCA; or plating the colored layer on one surface of the diffusion layer, and then bonding the surface, far away from the diffusion layer, of the colored layer to the Fresnel lens layer through the OCA.

Optionally, after the Fresnel lens layer is well bonded, a reflective layer is prepared on a surface of the Fresnel lens layer.

Optionally, before the Fresnel lens layer is bonded, the reflective layer is prepared on the surface of the Fresnel lens layer.

Optionally, the thickness of the OCA is 10-200 μm.

Optionally, the Fresnel lens layer is prepared through a roll-to-roll process. Firstly, an adhesive layer is coated on the substrate, or the film with a certain haze, or the diffusion layer, or the colored layer. Then, the Fresnel lens layer is formed on the adhesive layer by stamping through the roll-to-roll process with a Fresnel lens mold. Finally, drying solidification is performed.

Optionally, when the Fresnel lens mold is manufactured, a surface of the Fresnel lens mold has random point structures prepared through a laser direct writing process, and then the Fresnel lens layer is formed by stamping with the Fresnel lens mold, so that a surface of each annular protrusion of the Fresnel lens layer has scattered microstructures.

The present invention has at least the following advantages that: (1) the present invention provides a design method for the Fresnel lens mold, which reduces a processing difficulty of a Fresnel lens under the condition of keeping a light efficiency utilization rate unchanged; (2) the present invention provides two simple preparation methods for the Fresnel lens mold; and (3) the present invention provides the projection curtain with higher brightness and larger viewing angle than the existing projection curtain.

BRIEF DESCRIPTION OF THE DRAWINGS

These and other features, aspects, and advantages of the present invention will become better understood with regard to the following description, appended claims, and accompanying drawings wherein:

FIG. 1 is a schematic structural diagram of a Fresnel lens according to a first embodiment provided by the present invention.

FIG. 2 is a schematic structural diagram of a Fresnel lens according to a second embodiment provided by the present invention.

4a is a three-dimensional diagram when the three-dimensional model diagram is a cone, and FIG. 4b is an axial section of the cone;

DETAILED DESCRIPTION OF THE PREFERRED

Embodiments

In order to further describe technical means and effects adopted in the present invention to achieve the intended purposes of the present invention, specific implementations, structures, features, and effects thereof according to the present invention are described in detail below with reference to the accompanying drawings and preferred embodiments.

First Embodiment

Figure 1A:
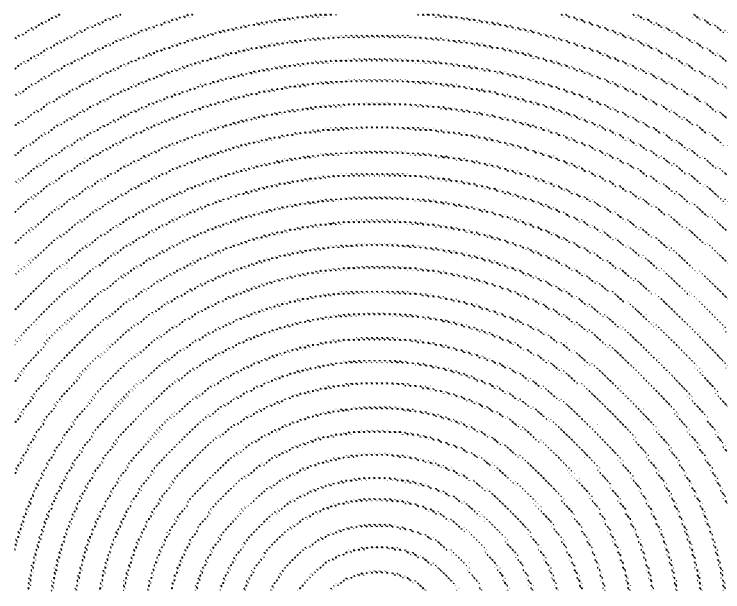
FIG. 1a is a top view.
Figure 1B:
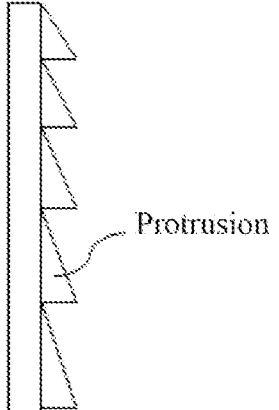
FIG. 1b is a cross-sectional view.
Figure 1C:
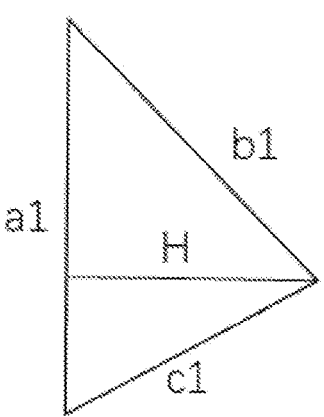
FIG. 1c is a cross-sectional view of a single microstructure unit.

FIG. 1 is a schematic structural diagram of a Fresnel lens according to a first embodiment provided by the present invention. FIG. 1a is a top view, and FIG. 1b is a cross-sectional view. As shown in FIG. 1a to FIG. 1b, the Fresnel lens comprises a plurality of annular protrusions protruding from a plane. The plurality of annular protrusions are arranged in circular bands. A cross-sectional shape of each annular protrusion along a cross section perpendicular to the plane is a triangular shape. As shown in FIG. 1c, one side, parallel to the plane, of the triangular shape is called a first side a1, and the other two sides are called a second side b1 and a third side c1. A height H of the first side a1 of each triangular shape is same. Meanwhile, in order to facilitate a preparation of a Fresnel lens mold through a micro-nano lithography method described later, an angle α1 between the third side c1 and the first side a1 of each triangular shape is preferably 90 degrees as shown in FIG. 1b. A length of the first side a1 of each triangular shape changes gradually, and the height of on the first side a1 each triangular shape remains unchanged, so that the cross section of the triangular shape changes gradually. The gradual change of the cross section of the triangular shape and the length of the first side a1 determines light gathering characteristics of a spherical Fresnel lens layer or an aspherical Fresnel lens layer.

The height H of the first side a1 of the triangular shape is:

$$H = P\frac{\lambda}{n-1},$$

wherein P is an integer greater than or equal to 1, λ is a central wavelength, and n is a refractive index of the Fresnel lens.

Counting outward from the center, the length $L_j$ of the first side a1 of a $j^{th}$ triangular shape is:

$$L_j = \sqrt{2P\lambda f}\left(\sqrt{j} - \sqrt{j-1}\right),$$

wherein P is an integer greater than or equal to 1, λ is the central wavelength, and f is a focal length of the Fresnel lens.

As an optional embodiment, an angle β1 between the second side b1 and the first side a1 of each triangular shape is preferably 65-81 degrees, the height on the first side a1 is preferably 1-20 μm, and the length of the first side a1 is preferably 0.02-0.3 mm.

Second Embodiment

Figure 2A:
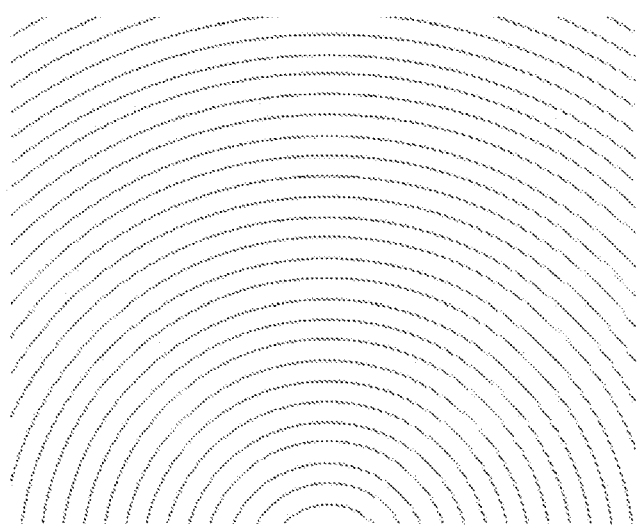
FIG. 2a is a top view.
Figure 2B:
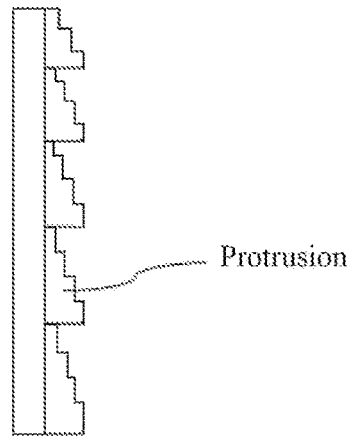
FIG. 2b is a cross-sectional view.
Figure 2C:
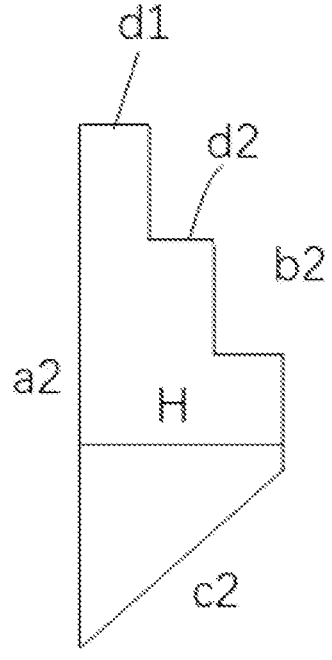
FIG. 2c is a cross-sectional view of a single microstructure unit.

FIG. 2 is a schematic structural diagram of a Fresnel lens according to a second embodiment provided by the present invention. FIG. 2a is a top view, and FIG. 2b is a cross-sectional view. As shown in FIG. 2a to FIG. 2b, the Fresnel lens comprises a plurality of annular protrusions protruding from a plane. The plurality of annular protrusions are arranged in circular bands. A cross-sectional shape of each annular protrusion along a cross section perpendicular to the plane is a multi-step shape. As shown in FIG. 2C, one side, parallel to the plane, of the multi-step shape is called a first side a2, one side with steps is called a second side b2, and one side without steps is called a third side c2. In order to prepare a Fresnel lens mold through a micro-nano lithography method described later, the third side c2 is perpendicular to the first side a2 as shown in FIG. 2b, and one side d1 of the two sides of each step is perpendicular to the first side a2 and the other side d2 of the two sides of each step is parallel to the first side a2, as shown in FIG. 2c. Meanwhile, a vertical distance from the side d2 of one step farthest from the first side a2 of each multi-step shape to the first side a2, is called the height H of the first side a2, and the height H of the first side a1 of each multi-step shape is same. The length of the first side a2 of the cross section of each multi-step shape changes gradually, and the height remains unchanged, so that the cross section of the multi-step shape changes gradually. The gradual change of the cross section of the multi-step shape and the length of the first side a2 determines the light gathering characteristics of a spherical Fresnel lens layer or an aspherical Fresnel lens layer.

The height H of the first side a2 is:

$$H = P\frac{\lambda}{n-1},$$

wherein P is an integer greater than or equal to 1, λ is a central wavelength, and n is a refractive index of the Fresnel lens.

Counting outward from the center, the length $L_j$ of the first side a2 of a $j^{th}$ multi-step shape is:

$$L_j = \sqrt{2P\lambda f}\left(\sqrt{j} - \sqrt{j-1}\right),$$

wherein P is an integer greater than or equal to 1, λ is the central wavelength, and f is the focal length of the Fresnel lens.

As an optional embodiment, the height of the first side a2 is preferably 1-20 μm, and the length of the first side a2 is preferably 0.02-0.3 mm.

In other embodiments of the present invention, the cross-sectional shape of the annular protrusion may also be a free surface shape. Specifically, the Fresnel lens comprises a plurality of annular protrusions protruding from a plane. The plurality of annular protrusions are arranged in circular bands. A cross-sectional shape of each annular protrusion along a cross section perpendicular to the plane is the free surface shape. One side, parallel to the plane, of the free surface shape is called a first side, one side with a shape freely changing is called a second side, and the other side is called a third side. A vertical distance from an intersection of the second side and the third side to the first side is called the height H of the first side. The height H of the first side of each free surface shape is same. Meanwhile, in order to facilitate the preparation of a Fresnel lens mold through a micro-nano lithography method described later, an angle α1 between the third side and the first side is preferably 90 degrees. The length of the first side a1 of the cross section of each free surface shape changes gradually, and the height remains unchanged, so that the cross section of the free surface shape changes gradually. The gradual change of the cross section of the free surface shape and the length of the first side a1 determines the light gathering characteristics of the spherical Fresnel lens layer or the aspherical Fresnel lens layer.

Third Embodiment

The present invention provides a design method for a Fresnel lens. The Fresnel lens comprises a plurality of annular protrusions protruding from a plane. The plurality of annular protrusions are arranged in circular bands. A cross-sectional shape of each annular protrusion along a cross section perpendicular to the plane is a triangular shape or a multi-step shape or a free surface shape. One side, parallel to the plane, of the triangular shape or multi-step shape or free surface shape is called a first side. Counting from the center, the length $L_j$ of the first side of the $j^{th}$ triangular shape or multi-step shape or free surface shape is:

$$L_j = \sqrt{2P\lambda f}\left(\sqrt{j} - \sqrt{j-1}\right) \qquad 3\text{--}1$$

wherein P is an integer greater than or equal to 1, λ is the central wavelength, and f is the focal length of the Fresnel lens.

Figure 3:
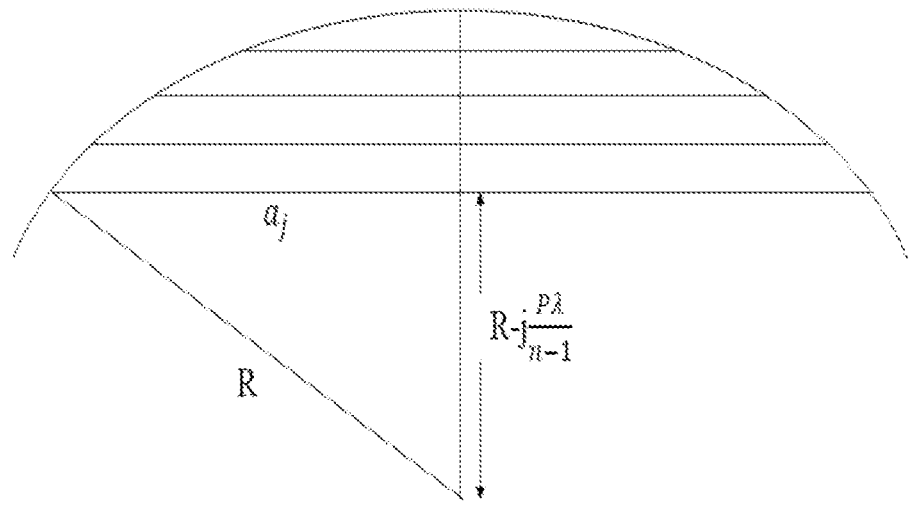
FIG. 3 is a geometric diagram for designing a Fresnel lens according to a third embodiment provided by the present invention.

As shown in FIG. 3, the length $L_j$ of the first side of the $j^{th}$ triangular shape or multi-step shape or free surface shape is obtained through the following steps:

At step 1, assuming that a radius of a spherical lens is R, the refractive index of a lens material of the spherical lens is n, and then a focal length of the spherical lens is:

$$f = \frac{R}{n-1}.$$

At step 2, collapsing a lens surface, the height H of each collapse is:

$$H = P\frac{\lambda}{n-1},$$

the $j^{th}$ circular band, collapsing j times.

At step 3, assuming that the radius of the $j^{th}$ circular band is $a_j$, according to a triangle relationship, there is:

$$\alpha_j^2 + \left(R - j\frac{P\lambda}{n-1}\right)^2 = R^2 \qquad 3\text{-}2$$

Obtaining after expansion:

$$\alpha_j^2 + j\left(\frac{P\lambda}{n-1}\right)\left(j\frac{P\lambda}{n-1} - 2R\right) = 0 \qquad 3\text{-}3$$

wherein $$\frac{\lambda}{n-1}$$

is very small relative to 2R, may be approximated by ignoring, and then the radius expression after approximation is:

$$a_j = \sqrt{2R_j\frac{P\lambda}{n-1}} = \sqrt{2jP\lambda f}. \qquad 3\text{-}4$$

At step 4, the length $L_j$ of the first side of the $j^{th}$ triangular shape or multi-step shape or free surface shape is:

$$L_j = \sqrt{2P\lambda f}\left(\sqrt{j} - \sqrt{j-1}\right) \qquad 3\text{-}5$$

It can be seen from the above formula 3-4 or 3-5 that a period of each microstructure unit of a Fresnel lens mold with the structure has been obviously expanded, and the expansion multiple is $$\sqrt{P}$$

times. Therefore, a processing difficulty may be reduced to a certain extent.

Fourth Embodiment

The present invention provides a preparation method for a Fresnel lens mold. The Fresnel lens mold comprises a plurality of annular microstructure units protruding along a plane. The plurality of annular microstructure units are arranged in circular bands. A cross-sectional shape of each annular microstructure unit along a cross section perpendicular to the plane is a triangular shape or multi-step shape or free surface shape. One side, parallel to the plane, of the triangular shape or multi-step shape or free surface shape is called a first side. Counting outward from the center, the length $L_j$ of the first side of a $j^{th}$ triangular shape or multi-step shape or free surface shape is:

$$L_j = \sqrt{2P\lambda f}\left(\sqrt{j} - \sqrt{j-1}\right)$$

wherein P is an integer greater than or equal to 1, $\lambda$ is the central wavelength, and f is the focal length of the Fresnel lens.

Similar to a definition of the height H of the first side of the triangular shape or multi-step shape or free-surface shape in the first and second embodiments, the height H of the first side of the triangular shape or multi-step shape or free-surface shape of the cross section of the annular micro-structure unit is:

$$H = P\frac{\lambda}{n-1}$$

wherein n is the refractive index of the Fresnel lens.

The preparation method for the Fresnel lens mold comprises the following steps.

Figure 4A:
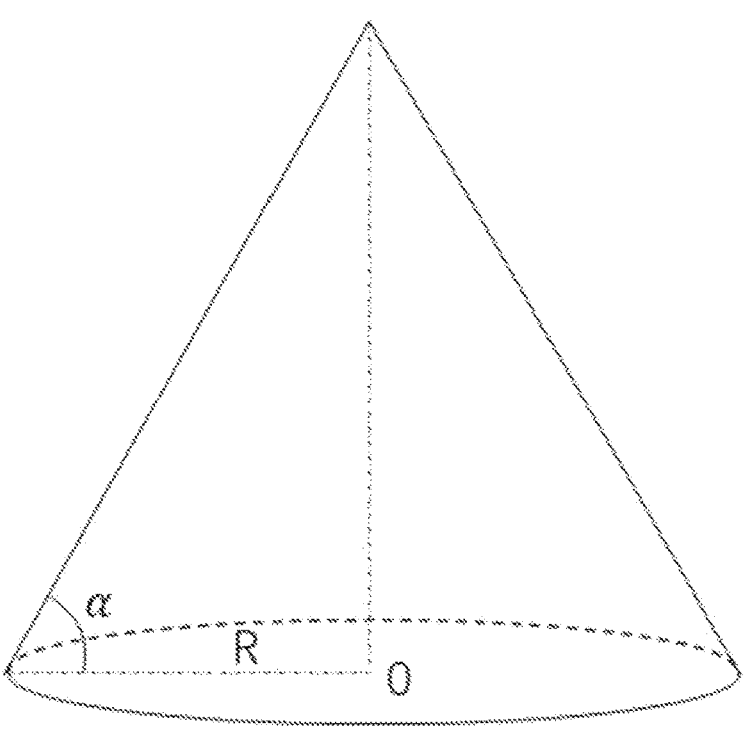
FIG. 4a and FIG. 4b are three-dimensional model diagrams of a mold for preparing a Fresnel lens according to a fourth embodiment provided by the present invention; FIG.

At Step 1: a three-dimensional model diagram is provided. Specifically, a three-dimensional model of the three-dimensional model diagram is preferably a cone, as shown in FIG. 4a.

A radius R of a bottom circle of the cone is:

$$R = \sqrt{2P\lambda f}\left(\sqrt{N}\right) \qquad 4\text{-}1$$

An angle $\alpha$ between a generatrix of the cone and the bottom circle of the cone is:

$$\tan\alpha = \frac{H}{\sqrt{2P\lambda f}\left(\sqrt{N} - \sqrt{N-1}\right)} \qquad 4\text{-}2$$

wherein $$H = P\frac{\lambda}{n-1} \qquad 4\text{-}3$$

P is an integer greater than or equal to 1, $\lambda$ is the central wavelength, n is the refractive index of the Fresnel lens material, f is the focal length of the Fresnel lens, and N is the total number of the annular microstructure units.

As an optional embodiment, the three-dimensional model of the three-dimensional model diagram is preferably hemi-spherical. The radius R of the bottom circle of the hemi-sphere, that is, the radius of the hemisphere is:

$$R = \sqrt{2P\lambda f}\left(\sqrt{N}\right) \qquad 4\text{-}4$$

wherein P is an integer greater than or equal to 1, $\lambda$ is the central wavelength, n is the refractive index of the Fresnel lens material, f is the focal length of the Fresnel lens, and N is the total number of the annular micro-structure units.

At step 2: at least one curvature function $f_1(x)$ is set, and a height of each point in the three-dimensional model is determined according to the curvature function $f_1(x)$. Specifically, the curvature function $f_1(x)$ is preferably:

$$f_1(x) = x \tan \alpha \qquad \text{4-5}$$

wherein an independent variable x refers to a distance from one point on a radius of the bottom circle of the cone to one end, away from the center of the bottom circle, of the radius.

As an optional embodiment, the curvature function $f_1(x)$ is preferably:

$$f_1(x) = \frac{H}{\Delta R_{j+1}} x \qquad \text{4-6}$$

wherein $$\Delta R_{j+1} = \sqrt{2P\lambda f}\left(\sqrt{j+1} - \sqrt{j}\right) \qquad \text{4-7}$$

the independent variable x refers to the distance from one point on a radius of the bottom circle of the hemisphere to one end, away from the center of the bottom circle of the hemisphere, of the radius.

Figure 4B:
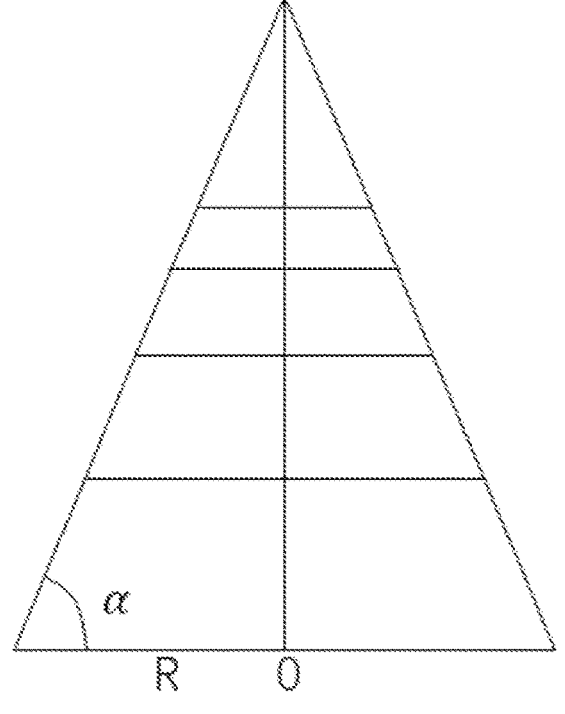

At step 3: the three-dimensional model diagram is divided in a height direction to obtain a plurality of height intervals. Specifically, the cone is divided into N parts by planes parallel to the bottom of the cone, as shown in FIG. 4b. Counting from the top of the cone, a length $\Delta L_j + 1$ of the conic generatrix cut by the $(j+1)^{th}$ height interval is:

$$\Delta L_{j+1} = \frac{\Delta R_{i+1}}{\cos \alpha}. \qquad \text{4-8}$$

As an optional embodiment, the hemisphere is divided into N equal parts by planes parallel to the bottom circle of the hemisphere. The length of each part:

$$\Delta L = \frac{\pi R}{2N} \qquad \text{4-9}$$

At Step 4: the three-dimensional model diagram is projected on a plane to obtain a gray scale image. The gray scale image comprises a plurality of pixel points, and each pixel point comprises a position and a gray scale value. A projection of the three-dimensional model diagram on the horizontal plane comprises a plurality of points, and each point comprises a position and a height value. The position of each point corresponds to the position of one pixel point in the gray scale image, and each height interval of the three-dimensional model diagram corresponds to a gray scale value range. For example, the gray scale value range is 0-64, or 0-256. According to the height range of the height interval where the height value of the three-dimensional model diagram is, and a corresponding function $f_2(x)$ of the gray scale value range, the gray scale value corresponding to the height value is calculated, and the gray scale value of the corresponding pixel point of the gray scale image is obtained. Specifically, the function $f_2(x)$ corresponding to the gray scale value within the gray scale value range and the height value within the height range of the $(j+1)^{th}$ height interval is preferably:

$$f_2(x) = \frac{Q_{max}}{\Delta R_{j+1} \tan \alpha} x \qquad \text{4-10}$$

As an optional embodiment, the function $f_2(x)$ corresponding to the gray scale value within the gray scale value range and the height value within the height range of the $(j+1)^{th}$ height interval is preferably:

$$f_2(x) = \frac{Q_{max}}{H} x \qquad \text{4-11}$$

wherein the gray scale value range is greater than or equal to 0 and less than or equal to Qmax. Qmax is the largest gray scale value in the gray scale value range, and the independent variable x refers to a height value in the height range.

Step 5: photoresist is coated on a target carrier, and lithography is performed according to the gray scale image to obtain a patterned structure. The gray scale image may be divided into a plurality of unit images, and then lithography is performed. According to a corresponding function $f_3(x)$ of the gray scale value and a lithography time, a slope is formed on the target carrier through exposure and development. The higher the gray scale value of the pixel point of the gray scale image is, the longer the lithography time is, and the deeper the lithography may be. The lower the gray scale value of the pixel point of the gray scale image is, the shorter the lithography time is, and the shallower the lithography may be. Specifically, the function $f_3(x)$ of the lithography time and the gray scale value is preferably:

$$f_3(x) = -\frac{H}{Q_{max}\eta} x + \frac{H}{\eta} \qquad \text{4-12}$$

wherein $\eta$ is a rate of lithography, i.e., the depth of lithography per unit time; and the independent variable x refers to the gray scale value.

As an optional embodiment, when the gray scale value is in a certain range, the lithography time remains unchanged. That is:

$$f_3(x) = f_3(x_2) \qquad \text{4-13}$$

wherein $$x_1 \leq x < x_2$$

As an optional embodiment, $$x_1 = \frac{Q_{max}}{M} i, \, x_2 = \frac{Q_{max}}{M}(i+1)$$

wherein M is the number of steps, and i is an integer greater than or equal to 0 and less than M.

At step 6: the patterned structure is transferred to another carrier through a UV transfer or metal growth process to form the Fresnel lens mold complementary to a pattern of the Fresnel lens.

Compared with the prior art, the preparation method for the Fresnel lens mold in the present embodiment comprises the steps that the three-dimensional model diagram is projected on the plane to obtain the gray scale image, the three-dimensional model diagram is divided into a plurality of height intervals according to the height, the height range of each height interval corresponds to the gray scale value range, the three-dimensional model diagram may be easily converted into the gray scale image, and thus, the preparation for the Fresnel lens mold is easily realized.

Fifth Embodiment

The present invention provides a preparation method for the Fresnel lens mold. The preparation method for the Fresnel lens mold comprises the following steps.

At step 1: a three-dimensional model diagram is provided.

At step 2: at least one curvature function is set, and a height of each point is determined in a three-dimensional model according to the curvature function.

At step 3: the three-dimensional model diagram is divided in a height direction to obtain a plurality of height intervals.

At step 4: the three-dimensional model diagram is projected on a plane to obtain a gray scale image.

The specific process of the steps 1-4 is the same as that of the steps 1-4 in the fourth embodiment, and will not be repeated here.

At Step 5: a plurality of sets of binary images are obtained by sampling the gray scale image. Specifically, M−1 sets of binary images are obtained by sampling the gray scale image according to the number of steps M.

Pixel points with gray scale values in a first range are assigned to black (or white), and pixel points with gray scale values in other ranges are assigned to white (or black) to obtain a first set of binary images.

Pixel points with gray scale values in a second range are assigned to black (or white), and pixel points with gray scale values in other ranges are assigned to white (or black) to obtain a second set of binary images.

Pixel points with gray scale values in a $k^{th}$ range are assigned to black (or white), and pixel points with gray scale values in other ranges are assigned to white (or black) to obtain a $k^{th}$ set of binary images. The $k^{th}$ range at least partially covers the $(k-1)^{th}$ range, M is an integer greater than or equal to 2, black represents 1 in the binary, and white represents 0 in the binary.

At step 6: photoresist is coated on a target carrier, superimposed lithography is performed based on the plurality of sets of binary images, and a multi-step-shaped patterned structure is formed on the target carrier through exposure and development.

As a preferable embodiment, the target carrier is baked after superimposed lithography to obtain a smooth patterned structure.

At step 7: the patterned structure is transferred to another carrier through a UV transfer or metal growth process to form the Fresnel lens mold complementary to a pattern of the Fresnel lens.

According to the present embodiment, the Fresnel lens mold is prepared through superimposed lithography with the plurality of sets of binary images. Therefore, the problems of long time consumption and low efficiency in preparation of the Fresnel lens mold through gray scale lithography may be effectively solved.

Sixth Embodiment

The present invention provides a projection curtain, as shown in 5a-5b. The projection curtain comprises a colored layer, a diffusion layer, a Fresnel lens layer, and a reflective layer sequentially stacked along a thickness direction. The Fresnel lens layer is a spherical Fresnel lens layer or an aspherical Fresnel lens layer.

Figure 5A:
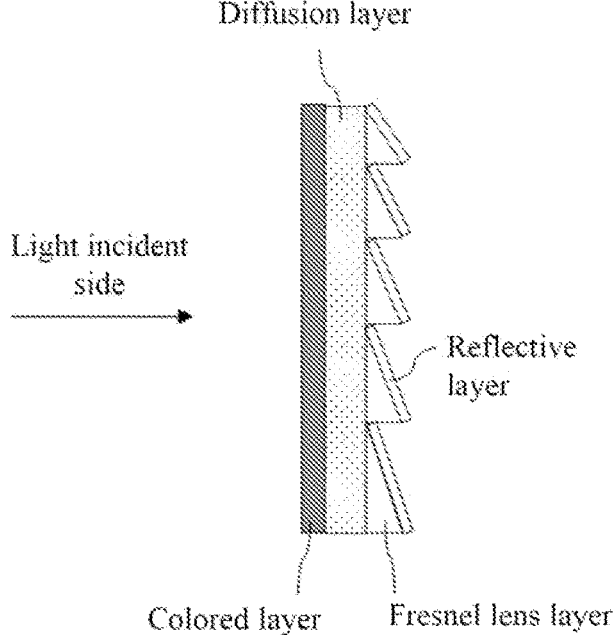
FIG. 5a-FIG. 5c are schematic structural diagrams of a projection curtain according to a sixth embodiment provided by the present invention.
Figure 5B:
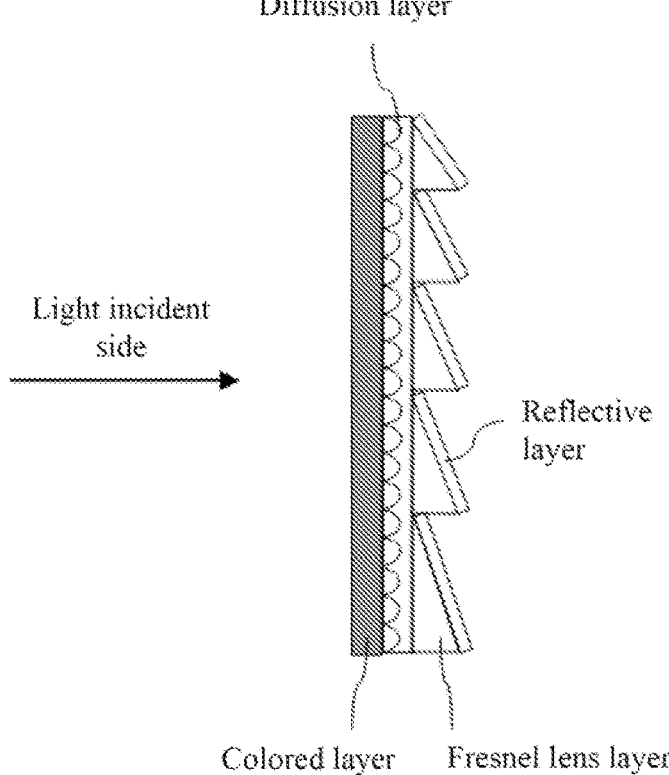
Figure 5C:
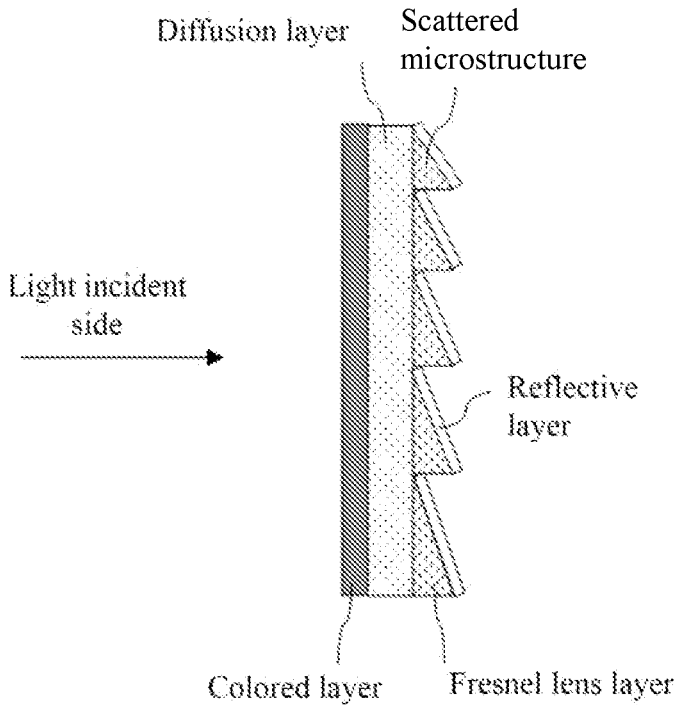

As an optional embodiment, as shown in FIG. 5c, the projection curtain comprises a diffusion layer, a colored layer, a Fresnel lens layer, and a reflective layer sequentially stacked along a thickness direction.

As an optional embodiment, the projection curtain comprises a diffusion layer, a Fresnel lens layer, a colored layer, and a reflective layer sequentially stacked along a thickness direction. The colored layer is arranged on surfaces of a plurality of annular protrusions of the Fresnel lens layer, and the reflective layer is arranged on surfaces of the colored layer.

The colored layer has functions of absorbing ambient light incident to the projection curtain, reducing a black brightness of an image, and improving a contrast of the image. The colored layer is usually formed by uniformly mixing a colorant in a high-transmittance resin with light transmittance greater than 75%, and then processing by injection molding, extrusion stretching or thermal curing. As the colorant, it is preferable to use dark-colored dyes or pigments such as gray or black, for example, metal salts such as carbon black, graphite and black iron oxide. As the resin with high light transmittance, PET (polyethylene terephthalate) resin, PC (polycarbonate) resin, MS (methyl methacrylate-styrene) resin, MBS (methyl methacrylate-butadiene-styrene) resin, TAC (triethylene cellulose) resin, PEN (polyethylene naphthalate) resin, acrylic resin and the like may be selected. A thickness of the colored layer is preferably 10-200 μm, and the light transmittance thereof is preferably 50-90%.

As an optional embodiment, the colored layer is a nickel-plated layer, and the light transmittance thereof is preferably 50-90%.

The diffusion layer is configured to enlarge a viewing angle and increase uniformity of brightness in the projection curtain. The diffusion layer may be a film in which diffusion particles with diffuse light scattering function are uniformly mixed in a light-transmitting resin, as shown in FIG. 5a. The difference between a refractive index of the resin and a refractive index of the diffusion particles is less than 0.4 in order to expand the viewing angle and increase a surface uniformity of brightness. The PET (polyethylene terephthalate) resin, PC (polycarbonate) resin, MS (methyl methacrylate-styrene) resin, MBS (methyl methacrylate-butadiene-styrene) resin, TAC (triethylene cellulose) resin, PEN (polyethylene naphthalate) resin, acrylic resin and the like are preferably selected as the light-transmitting resin of the diffusion layer. The diffusion particles may be inorganic diffusion particles and/or organic diffusion particles. The inorganic diffusion particles may be selected from particles formed by one or more of alumina, antimony oxide, cadmium oxide, tantalum oxide, zirconium oxide, iron oxide, copper oxide, lead oxide, manganese oxide, tin oxide, tungsten oxide, zinc selenide, niobium oxide, zinc telluride, vanadium oxide, molybdenum oxide, zinc sulfide, zinc oxide, cadmium sulfide, cadmium selenide, titanium oxide and lead sulfide. The organic diffusion particles may be selected from particles formed by one or more of polystyrene, acrylic resin, polyurethane, polytetrafluoroethylene, melamine resin, benzene melamine resin, epoxy resin or silicone resin. A particle size of the diffusion particles is 1-50 µm, preferably 5-30 µm. A thickness of the diffusion layer is 50-1000 µm, preferably 188 µm.

As an optional embodiment, as shown in FIG. 5b, the diffusion layer is a plurality of micro-nano structures with diffusion function. The height of the micro-nano structures is 1-20 µm, and a cross-sectional shape of the micro-nano structures is one or a combination of two or more of arc, triangle, square, rectangle, trapezoid or irregular shape. For the purpose that the projection curtain is flexible and can be curled, the micro-nano structures are preferably made of flexible materials, such as resin.

As an optional embodiment, the diffusion layer may a semi-transparent and semi-reflective film with a haze value of preferably 50-90% and a light transmittance of preferably 55-65%.

The reflective layer may be a metal reflective layer or an alloy reflective layer. The metal reflective layer comprises but is not limited to aluminum, silver, gold, chromium, nickel or copper. The alloy reflective layer comprises but is not limited to nickel-chromium alloy, aluminum alloy or titanium alloy.

As a preferable embodiment, the reflective layer is preferably an aluminum metal reflective layer, which is prepared through an electroplating or spraying technology. When the reflective layer is prepared through the electroplating technology, the thickness thereof is preferably 0.04-3 µm, and the particle size of aluminum particles thereof is preferably within 500 nm. When the reflective layer is prepared by the spraying technology, the thickness thereof is less than 10-20 µm, and the particle size thereof is more than 5 µm.

The Fresnel lens layer plays a role in adjusting a propagation direction of a projection beam. The Fresnel lens layer is the Fresnel lens described in the first and second embodiments.

As an optional embodiment, in order to make the projection curtain have relatively stronger brightness (i.e. gain) and a relatively larger viewing angle (i.e. half viewing angle), a surface of each annular protrusion of the Fresnel lens layer has scattered microstructures, as shown in FIG. 5c.

As an optional embodiment, the Fresnel lens layer is arranged on a substrate. The substrate is preferably a high-transmittance resin material with a light transmittance of more than 75% and a preferable thickness of 10-200 µm.

As an optional embodiment, the Fresnel lens layer may be integrally formed with the substrate.

As an optional embodiment, the Fresnel lens layer may be bonded to the substrate through an optical clear adhesive (OCA), and a thickness of the optical clear adhesive is preferably 10-200 µm.

As an optional embodiment, the Fresnel lens layer is arranged on a film with a certain haze. A haze value of the film is preferably 50-90% and the thickness of the film is preferably 50-200 µm.

As an optional embodiment, the Fresnel lens layer is bonded to the film with a certain haze or a sheet material through the OCA. The thickness of the OCA is preferably 10-200 µm.

The present invention further provides a preparation method for the projection curtain.

The diffusion layer, the colored layer and the Fresnel lens layer are sequentially bonded through the OCA; or the colored layer, the diffusion layer and the Fresnel lens layer are sequentially bonded through the OCA. The thickness of the OCA is 10-200 µm.

As an optional embodiment, the diffusion layer and the colored layer are prepared by coating in turn, and then are bonded to the Fresnel lens layer through the OCA; or the colored layer and the diffusion layer are prepared by coating in turn, and then are bonded to the Fresnel lens layer through the OCA. The thickness of the OCA is 10-200 µm.

As an optional embodiment, the Fresnel lens layer is prepared through a roll-to-roll process. Firstly, an adhesive layer is coated on the substrate, or the film with a certain haze, or the diffusion layer, or the colored layer. Then, the Fresnel lens layer is formed by stamping on the adhesive layer through the roll-to-roll process with the Fresnel lens mold described in the fourth or fifth embodiments. Finally, drying solidification is performed.

As an optional embodiment, in order to make the projection curtain have relatively stronger brightness (i.e. gain) and a relatively larger viewing angle (i.e. half viewing angle), when the Fresnel lens mold in the fourth or fifth embodiments is manufactured, a surface of the Fresnel lens mold has random point structures prepared through a laser direct writing process, and then the Fresnel lens layer is formed by stamping with the Fresnel lens mold, so that a surface of each annular protrusion of the Fresnel lens layer has scattered microstructures.

As an optional embodiment, the colored layer is plated on one surface of the diffusion layer, and then the other surface of the diffusion layer is bonded to the Fresnel lens layer through the OCA; or the colored layer is plated on one surface of the diffusion layer, and then the surface, far away from the diffusion layer, of the colored layer is bonded to the Fresnel lens layer through the OCA. The thickness of the OCA is 10-200 µm.

After the Fresnel lens layer is well bonded, the reflective layer is prepared on the surface of the Fresnel lens layer.

As a preferable embodiment, before the Fresnel lens layer is bonded, the reflective layer is prepared on the surface of the Fresnel lens layer.

As an optional embodiment, the above bonding adopts a roll-to-roll process.

Seventh Embodiment

Figure 6:
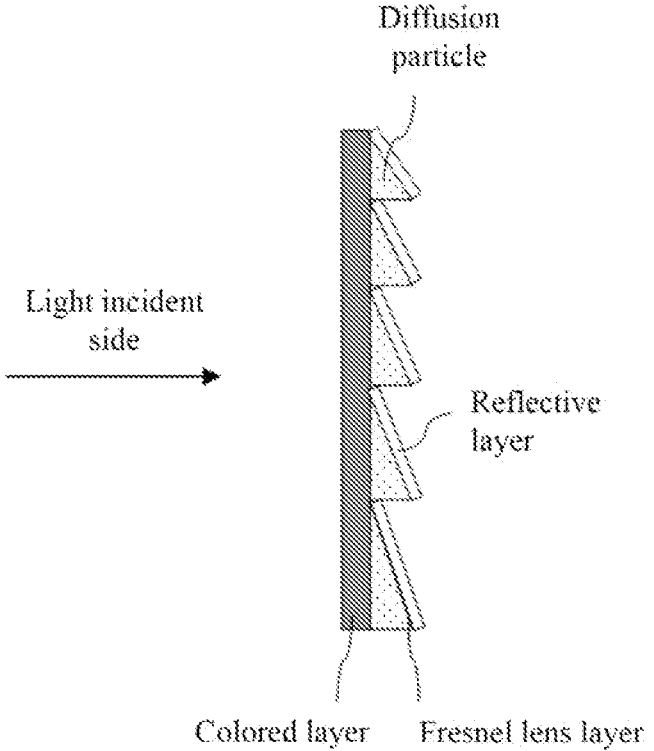
FIG. 6 is a schematic structural diagram of a projection curtain according to a seventh embodiment provided by the present invention.

The present invention provides a projection curtain, as shown in FIG. 6. The projection curtain comprises a colored layer, a Fresnel lens layer, and a reflective layer sequentially stacked along a thickness direction. The Fresnel lens layer is a spherical Fresnel lens layer or an aspherical Fresnel lens layer.

The colored layer and the reflective layer are described in the sixth embodiment, and will not be repeated here. The preparation method for the Fresnel lens layer is described in the sixth embodiment, and is not repeated here, except that diffusion particles are added to the adhesive layer for preparing the Fresnel lens layer. The difference between the refractive index of the material of the Fresnel lens layer and the refractive index of the diffusion particles is less than 0.4. The diffusion particles may be the diffusion particles of the inorganic or organic materials described in the fifth embodiment, and are not repeated here.

On the one hand, a lack of the diffusion layer makes the projection curtain thinner and softer, and thus more conducive to curling. On the other hand, the diffusion particles are added to the Fresnel lens layer, so that the viewing angle of the image projected on the projection curtain is larger and the surface uniformity of brightness is better.

The present invention further provides a preparation method for the projection curtain.

The colored layer and the Fresnel lens layer are bonded through an OCA in turn. The thickness of the OCA is 10-200 μm.

After the Fresnel lens layer is well bonded, the reflective layer is prepared on the surface of the Fresnel lens layer.

As an optional embodiment, before the Fresnel lens layer is bonded, the reflective layer is prepared on the surface of the Fresnel lens layer.

As an optional embodiment, the above bonding adopts a roll-to-roll

Eighth Embodiment

Figure 7:
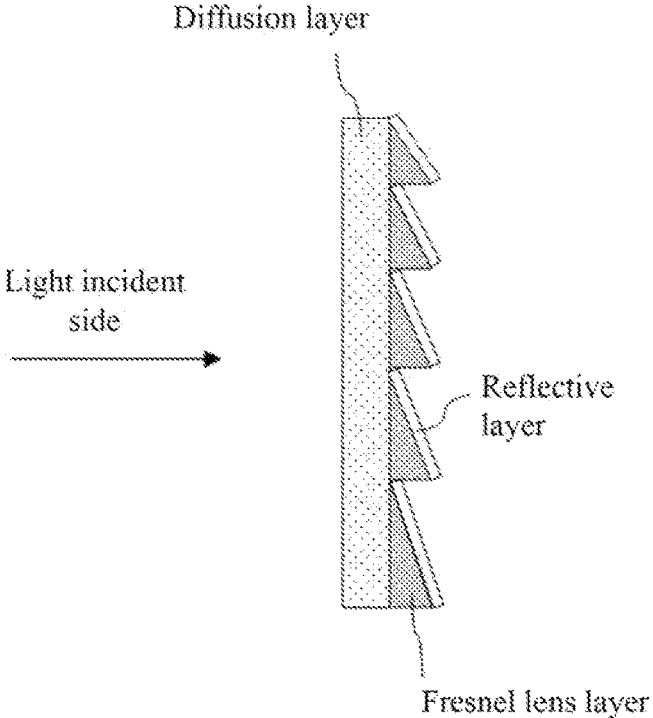
FIG. 7 is a schematic structural diagram of a projection curtain according to an eighth embodiment provided by the present invention.

The present invention provides a projection curtain, as shown in FIG. 7. The projection curtain comprises a diffusion layer, a Fresnel lens layer, and a reflective layer sequentially stacked along a thickness direction. The Fresnel lens layer is a spherical Fresnel lens layer or an aspherical Fresnel lens layer.

The diffusion layer and the reflective layer are described in the sixth embodiment, and will not be repeated here. The preparation method for the Fresnel lens layer is described in the sixth embodiment, and is not repeated here, except that colored particles are added to the adhesive layer for preparing the Fresnel lens layer. As colored particle materials, it is preferable to use dark-colored dyes or pigments such as gray or black, for example, metal salts such as carbon black, graphite and black iron oxide. The particle size of the colored particles is preferably less than 200 μm.

On the one hand, as the projection curtain of the present embodiment reduces the colored layer, the projection curtain becomes thinner and softer, and is more conducive to curling. On the other hand, the colored particles are added to the Fresnel lens layer, so that the black brightness of the image caused by ambient light is significantly reduced, and the contrast of the image is greatly improved.

The present invention further provides a preparation method for the projection curtain.

The diffusion layer and the Fresnel lens layer are bonded through an OCA in turn. The thickness of the OCA is 10-200 μm.

After the Fresnel lens layer is well bonded, the reflective layer is prepared on the surface of the Fresnel lens.

As an optional embodiment, before the Fresnel lens layer is bonded, the reflective layer is prepared on the surface of the Fresnel lens layer.

As an optional embodiment, the above bonding adopts a roll-to-roll

Ninth Embodiment

Figure 8:
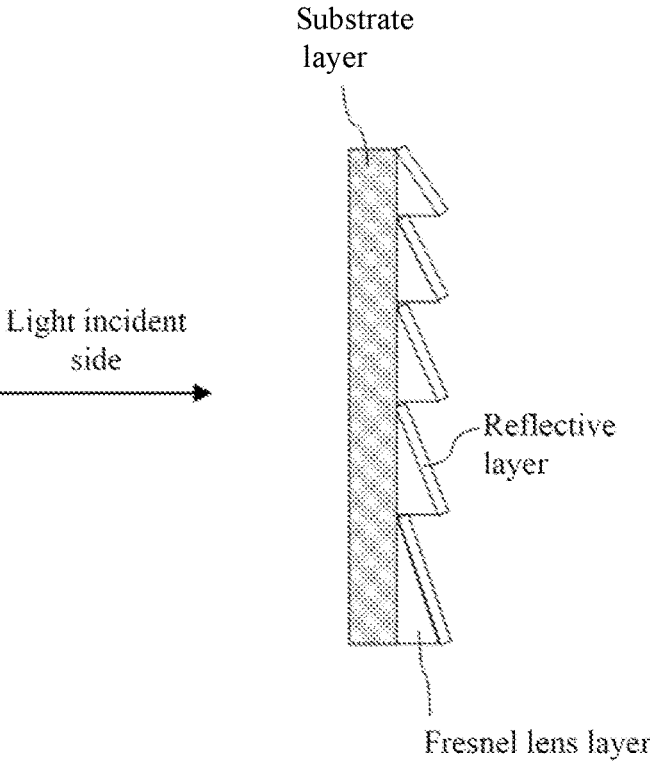
FIG. 8 is a schematic structural diagram of a projection curtain according to a ninth embodiment provided by the present invention.

The present invention provides a projection curtain, as shown in FIG. 8. The projection curtain comprises a Fresnel lens layer, and a reflective layer sequentially stacked along a thickness direction. The Fresnel lens layer is a spherical Fresnel lens layer or an aspherical Fresnel lens layer.

The reflective layer is described in the sixth embodiment, and will not be repeated here. The preparation method for the Fresnel lens layer is described in the sixth embodiment, and is not repeated here, except that colored particles and diffusion particles are added to the substrate layer of the Fresnel lens layer or the film with a certain haze. As the colored particle materials, it is preferable to use dark-colored dyes or pigments such as gray or black, for example, metal salts such as carbon black, graphite and black iron oxide. The diffusion particles may be inorganic diffusion particles and/or organic diffusion particles, and materials thereof are described in the sixth embodiment, which will not be repeated here. The particle size of the colored particles is less than 200 μm. The particle size of the diffusion particles is 1-50 μm, preferably 5-30 μm. The thickness of the substrate layer is preferably 50 to 200 μm.

On the one hand, as the projection curtain of the present embodiment reduces the colored layer and the diffusion layer, the projection curtain becomes thinner and softer, and is more conducive to curling. On the other hand, the projection curtain prepared in this way can not only significantly reduce the black brightness of the image caused by ambient light and greatly improve the contrast of the image, but also expand the viewing angle of the image projected on the projection curtain and greatly improve the surface uniformity of the brightness.

Tenth Embodiment

Figures 9, 10:
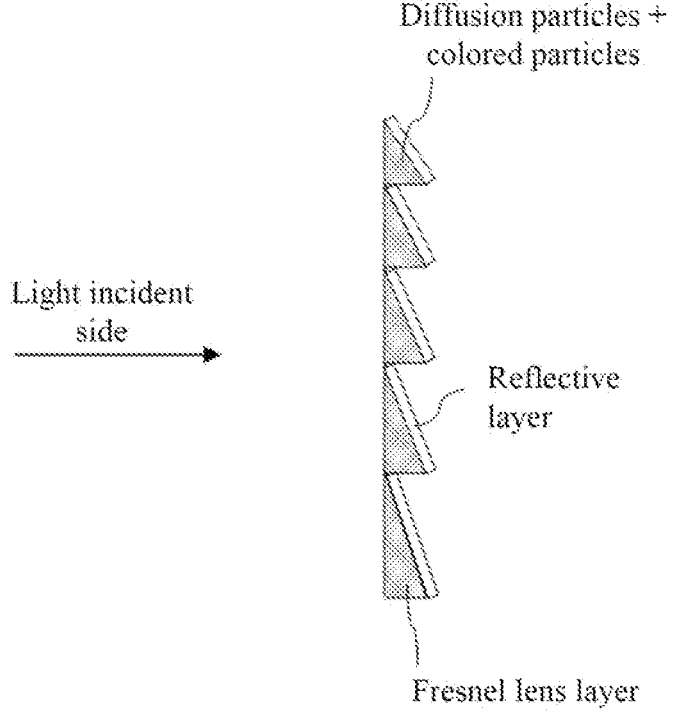
FIG. 9 is a schematic structural diagram of a projection curtain according to a tenth embodiment provided by the present invention.
FIG. 10 shows test results of a Fresnel lens having scattered microstructures on a surface thereof and a reflective layer prepared by a coating process.

The present invention provides a projection curtain, as shown in FIG. 9. The projection curtain comprises a Fresnel lens layer, and a reflective layer sequentially stacked along a thickness direction. The Fresnel lens layer is a spherical Fresnel lens layer or an aspherical Fresnel lens layer.

The reflective layer is described in the sixth embodiment, and will not be repeated here. The preparation method for the Fresnel lens layer is described in the sixth embodiment, and is not repeated here, except that colored particles and diffusion particles are added to the adhesive layer for preparing the Fresnel lens layer. The diffusion particles and the colored particles are described in the ninth embodiment, and will not be repeated here.

It is unintentionally found that when the Fresnel lens layer in the fifth to tenth embodiments is prepared by stamping with the Fresnel lens mold shown in the fourth and fifth embodiments, and the surface of the Fresnel lens mold shown in the fourth and fifth embodiments has random point structures prepared through a laser direct writing process, the reflective layer adopts a coating (e.g., electroplating, evaporation, or sputtering) process, and exhibits higher brightness (i.e., gain) and a larger viewing angle (e.g., a half viewing angle) than the existing projection curtain. The Fresnel lens layer of the existing projection curtain is prepared by stamping with the Fresnel lens mold shown in the fourth and fifth embodiments, but the surface of the Fresnel lens mold has no random point structure prepared through a laser direct writing process, and the reflective layer adopts an aluminum spraying process. The experimental data are shown in FIG. 10. The reason is unknown and is under further study.

Terms such as "comprise", "comprise" or any other variants herein are intended to encompass non-exclusive inclusion, in addition to those elements listed, but also other elements not explicitly listed.

Orientation terms such as "front", "back", "up", and "down" involved herein are defined by positions of parts in the accompanying drawings and between the parts, just for the clarity and convenience of expression of the technical solution. It should be understood that the use of the orientation terms should not limit the protection scope of this application.

The above embodiments herein and features in the embodiments may be combined with each other in a case that no conflict occurs.

The above are only preferred embodiments of the present invention and are not intended to limit the present invention. Any modification, equivalent replacement, or improvement made within the spirit and principle of the present invention shall be comprised in the protection scope of the present invention.

What is claimed is:

1. A preparation method for a projection curtain comprising a colored layer, a diffusion layer, a Fresnel lens layer, and a reflective layer sequentially stacked along a thickness direction, or comprising a colored layer, a Fresnel lens layer, and a reflective layer sequentially stacked along a thickness direction, or comprising a diffusion layer, a Fresnel lens layer, and a reflective layer sequentially stacked along a thickness direction, or comprising a Fresnel lens layer, and a reflective layer sequentially stacked along a thickness direction;

wherein the Fresnel lens layer comprises a plurality of annular protrusions protruding from a plane, the plurality of annular protrusions are arranged in circular bands, and a cross-sectional shape of each annular protrusion along a cross section perpendicular to the plane is a triangular shape or a multi-step shape or a free surface shape;

wherein the reflective layer is a metal reflective layer or an alloy reflective layer, the metal reflective layer comprises aluminum, silver, gold, chromium, nickel or copper, and the alloy reflective layer comprises nickel-chromium alloy, aluminum alloy or titanium alloy;

the method comprising:

bonding any two of the diffusion layer, the colored layer and the Fresnel lens layer through an optical clear adhesive (OCA); or preparing the diffusion layer and the colored layer by coating, and then bonding the diffusion layer and the colored layer to the Fresnel lens layer through the OCA; or plating the colored layer on one surface of the diffusion layer, and then bonding the opposite surface of the diffusion layer to the Fresnel lens layer through the OCA; or plating the colored layer on one surface of the diffusion layer, and then bonding the opposite surface of the colored layer to the Fresnel lens layer through the OCA;

wherein the Fresnel lens layer is prepared through a roll-to-roll process, and the roll-to-roll process comprising:

coating an adhesive layer on a substrate, or a film with a certain haze, or the diffusion layer, or the colored layer, and performing roll-to-roll stamping on the adhesive layer through a Fresnel lens mold, wherein the Fresnel lens mold used in the stamping has random point structures on a surface thereof prepared through a laser direct writing process, wherein the Fresnel lens layer further comprises a substrate layer arranged at a bottom of the plurality of annular protrusions or a film layer with a certain haze;

wherein a surface of each annular protrusion of the Fresnel lens layer has scattered microstructures; and/or wherein the reflective layer is prepared by an electroplating, evaporation, sputtering or coating process.

* * * * *